(12) United States Patent
Armiroli et al.

(10) Patent No.: US 7,726,329 B2
(45) Date of Patent: Jun. 1, 2010

(54) DISCHARGE RATE AND PRESSURE CONTROL SOLENOID VALVE

(75) Inventors: Jean Armiroli, Beaulieu-sur-Mer (FR);
Gérard Desaint, Menton (FR);
Jean-Louis Magnaval, Saint Laurent Du Var (FR); Bruno Lhermitte, Cagnes-sur-Mer (FR)

(73) Assignee: BorgWarner Inc., Auburn Hills, MI (US)

( * ) Notice: Subject to any disclaimer, the term of this patent is extended or adjusted under 35 U.S.C. 154(b) by 301 days.

(21) Appl. No.: 10/566,789

(22) PCT Filed: Jul. 28, 2004

(86) PCT No.: PCT/FR2004/002017

§ 371 (c)(1),
(2), (4) Date: Jan. 31, 2006

(87) PCT Pub. No.: WO2005/013024

PCT Pub. Date: Feb. 10, 2005

(65) Prior Publication Data

US 2006/0225797 A1 Oct. 12, 2006

(30) Foreign Application Priority Data

Aug. 1, 2003 (FR) .................................. 03 09528

(51) Int. Cl.
*F02M 37/00* (2006.01)

(52) U.S. Cl. .................... 137/115.18; 123/511; 123/512

(58) Field of Classification Search .................. 123/511, 123/514; 137/115.14, 115.18
See application file for complete search history.

(56) References Cited

U.S. PATENT DOCUMENTS 3,193,250 A * 7/1965 Good et al. .................. 251/363

7,270,113 B2 * 9/2007 Hervault et al. ............. 123/446

(Continued)

FOREIGN PATENT DOCUMENTS

DE 196 32 368 2/1998

(Continued)

OTHER PUBLICATIONS

Translation of WO98/45594.*

(Continued)

*Primary Examiner*—John Rivell
*Assistant Examiner*—Craig M Schneider
(74) *Attorney, Agent, or Firm*—Reising Ethington P.C.

(57) ABSTRACT

The inventive discharge rate and pressure control solenoid valve (1) is used for a circuit consisting of a low pressure part and a high-pressure part and controls the discharge rate of a low-pressure fluid with the aid of a sliding spool (18) in a liner (22) provided with at least one fluid feeding orifice (20) and one fluid exhausting orifice (21) respectively. Said spool (18) is electrically actuated by means of an electromagnet acting in an opposite direction to recoil means (26) for closing the passage between the feeding (20) and exhausting (21) orifices when a control current for the electromagnet is equal to zero and for gradually opening said passage according to a threshold value of the flow, the pressure control being applicable to a high-pressure fluid. The recoil means (26) are inserted between the spool (18) and a flap device which closes an inlet orifice in the liner (22) of a high pressure fluid and is connected to the low-pressure fluid feeding orifice at least at a slide position corresponding to the control current when it is less than said threshold value. The recoil means (26) are positioned and dimensioned in such a way that the flap is openable when the current is equal to or near zero in order to drop the pressure in the high pressure circuit.

38 Claims, 5 Drawing Sheets

U.S. PATENT DOCUMENTS

2002/0083985 A1 7/2002 Neuhaus et al.
2004/0123841 A1* 7/2004 Kelly .......................... 123/447

FOREIGN PATENT DOCUMENTS

| DE | 19632368 | 2/1998 |
| DE | 297 05 635 | 9/1998 |
| WO | WO98/45594 * | 10/1998 |
| WO | WO2004/007950 * | 1/2004 |

OTHER PUBLICATIONS

International Search Report re PCT/FR2004/002017 (2 pages).

Delphion English Abstract for DE 297 05 635 (3 pages).

* cited by examiner

DISCHARGE RATE AND PRESSURE CONTROL SOLENOID VALVE

The present invention relates to a discharge rate and pressure control solenoid valve which may be used in a circuit including a low pressure part and a high pressure part.

Conventionally it allows the low pressure fluid rate to be controlled by means of a sliding spool in a liner in which at least one fluid feeding orifice and one fluid exhaust orifice are provided respectively, said spool being electrically actuated by means of an electromagnet acting in an opposite direction to recoil means. These recoil means are dimensioned and positioned so that, for a zero electromagnet control current, the passage between the feeding and exhaust orifices is closed, and then gradually opened according to a threshold value of the current.

Pressure control, also performed by the solenoid valve is applied to the high pressure fluid. This invention for example is applied to a gasoline injection system for a heat engine with a common rail. This system moreover forms another aspect of the invention. In this application, the usefulness of parallel discharge rate and pressure control results from the selective requirement of rapidly discharging said rail in pressure, for example when the user of the vehicle releases the accelerator.

The combination of pressure discharge in the case of overpressure in the rail and checking the discharge rate control has never been applied to this day in a same device.

In the example above, the rail is fed with high pressure gasoline by a pump, itself dependent on low pressure gasoline from the tank via the solenoid valve of the invention, which controls the discharge rate thereof. Pressure control is performed on highly pressurized gasoline, downstream from the pump, and it is managed by a computer obtaining information on the value of said pressure via a sensor positioned in the common rail.

In the text which follows, in order to explain the operation of the solenoid valve of the invention, reference will systematically be made to the example of engines with a common rail. The low pressure with a discharge rate controlled by the solenoid valve is of the order of 6 bars at the inlet of the solenoid valve, from the gasoline tank and of 5 bars at the outlet, upstream from the pump. The latter raises it to 120 bars or to 200 bars according to the pump models and the actuation operations. Therefore, pressures of these orders of magnitude are the ones that the solenoid valve should handle when it applies high pressure control.

The pressure in the rail is controlled by the control of the valve discharge rate. The pressure sensor provides information which allows the computer to transmit a set value to the valve, requesting it to provide more or less discharge rate. Therefore, this is a closed loop operation. If the pressure is too high in the rail, the information provided by the sensor will tell the calculator to send to the solenoid valve a set value requesting it to act on the high pressure in order to reduce it.

For this purpose, and according to the invention, the recoil means against which the electromagnet acts are inserted between the spool and a flap device capable of closing an inlet orifice in the high pressure fluid liner, which communicates with the low pressure fluid feeding orifice at least in the position of the spool corresponding to a control current less than the threshold value allowing the passage between the low pressure fluid feeding and exhaust orifices to be opened. These recoil means are further positioned and dimensioned so that the flap may be opened for a current equal to or near zero, in order to cause the pressure in the high pressure circuit to drop.

In other words, when the pressure value is too high in the rail, the computer will be instructed to reduce the current sent to the electromagnet, and therefore reduce the force exerted on the internal spring by the mobile core of said electromagnet. The overpressure may then open the flap and discharge the rail, with a small discharge rate, in order to cause the pressure to drop therein. Theoretically, this discharge rate is sent to the gasoline tank.

Conversely, if the pressure in the rail is too low, the set current value sent by the computer for the benefit of the electromagnet is increased, and the consequence is an increase in the discharge rate, and therefore of pressure in the rail. In this case, the recoil means exert a larger pressure on the flap, which cannot open and maintains the high pressure in the rail.

Preferably, the mobile spool is positioned and dimensioned so that the low pressure fluid feeding and exhaust orifices are not connected until the force exerted by the spool on the flap device via the recoil means, in order to close said flap, is sufficient for providing said closure when the pressure reached in the high pressure circuit is the rated operating pressure.

In other words, the different components involved in controlling the discharge rate on the one hand and the pressure on the other hand, for both low and high pressure circuits respectively, should be configured in such a way that control of the low pressure rate by connecting the feeding and exhaust orifices is only performed after reaching a rated and stable pressure in the high pressure circuit, for current values which guarantee that the flap cannot open. With this separation of the control features, the idle speed of the engine may be controlled very accurately and with constant pressure.

In reality, leaks occur between the low pressure feeding and exhaust orifices, even before the spool is in a position allowing a passage between them. The leakage rate is then raised to a high pressure by the pump, and used for having the engine run at idle, which does not require proportionality of the discharge rate relatively to the current. At this point, it is simply necessary that the current be set sufficiently high in order to prevent opening of the flap when the pressure in the rail allows the injectors to idle.

But there remains an interval between the current required for closing the flap at these pressures and the one required for operating the discharge rate control proportionally to the current, when the inlet and exhaust orifices are connected. The purpose and the effect of this interval is not to introduce pressure variations into the rail, which may vary the engine speed and therefore generate noise or cause operating problems at normal speed.

Preferably, the spool is driven by a pusher firmly attached to the mobile core of the electromagnet, the recoil means consisting of a coil spring axially positioned between the end of the spool and the flap device.

The general configuration is therefore axial, and successively comprises the mobile core of the electromagnet, a pusher rod, the spool, the coil spring, and the flap device.

According to one possibility, the flap device includes a sliding sleeve in the liner and actuated by recoil means having an axial arm provided with an end with a hemispherical aspect which may close the fluid inlet orifice, said orifice opening into the volume of the spool, at a seat against which the hemispherical end is pressed, in the event of closure of the flap.

According to one alternative, the flap device includes a ball which may close the high pressure fluid inlet orifice.

The aforementioned configuration is optimized so that the flap cannot randomly leak, because the program of the computer can only check for a constant leak, by the presence of the pressure sensor which provides closed loop operation. A random leak is banned, insofar that it may generate unacceptable pressure changes in the rail.

Whatever the operating mode of the flap, either with a ball or a hemispherical head arm, the configuration of the seat of this ball as well as the relative layout and shape of the different components, notably provided according to the value of the current, guarantee the absence of any hazards. In particular, the electromagnet is calculated so as to have constant force over the whole stroke of the spool, in order to improve positioning accuracy of the spool according to the set current value.

The seat for example consists in an axial conduit opening into the spool and chamfered at its link with the inlet orifice, said conduit being flanked with clearance spaces for the fluid, open onto the volume of the liner and obtained by a cylindrical milling cutter stroke with smaller thickness and with an axis perpendicular to that of the conduit, respectively.

The positioning of the ball or the arm is thus well guaranteed, as well as the guiding of the high pressure fluid from the circuit positioned downstream from the pump.

In the ball configuration, the liner includes a central axial protrusion provided so as to be inserted in the conduit of the seat and to exert a force on the ball.

In the hemispherical head axial arm configuration, it is the arm which is provided in order to be inserted in said conduit and to close the inlet orifice.

Preferably, the sleeve has at least one channel for letting the fluid pass through towards the spool.

Still preferably, the inlet orifice is provided in a part closing the liner, and its position is adjustable relatively to the latter. It is therefore possible to proceed with adjusting the position of the seat in order to optimize the operation of the valve.

According to the invention, for an electromagnet control current equal to zero, the recoil means exert on the flap a force such that the fluid is required to have a pressure of the order of 30 bars in order to open it.

As a rule, in the event of overpressure in the rail, the set current value sent by the computer to the electromagnet is either a zero value, or a value near zero. Considering the order of magnitude of the rated pressures which should prevail in the rail during running of the engine (120, 200 bars), there is no problem in opening the flap in the case of overpressure.

The invention, as already mentioned, also relates to a gasoline injection system for heat engines with common rails, provided with a solenoid valve as described above, the inlet orifice of which is connected to the high pressure fluid circuit positioned downstream from the pump.

In order that operation may be performed properly, the common rail includes a pressure sensor connected to an electronic central unit used as a computer and which provides the set current value to the electromagnet of the solenoid valve.

BRIEF DESCRIPTION OF THE DRAWINGS

The invention will now be described in more detail, with reference to the appended figures wherein.

DETAILED DESCRIPTION OF THE INVENTION

Figure 1:
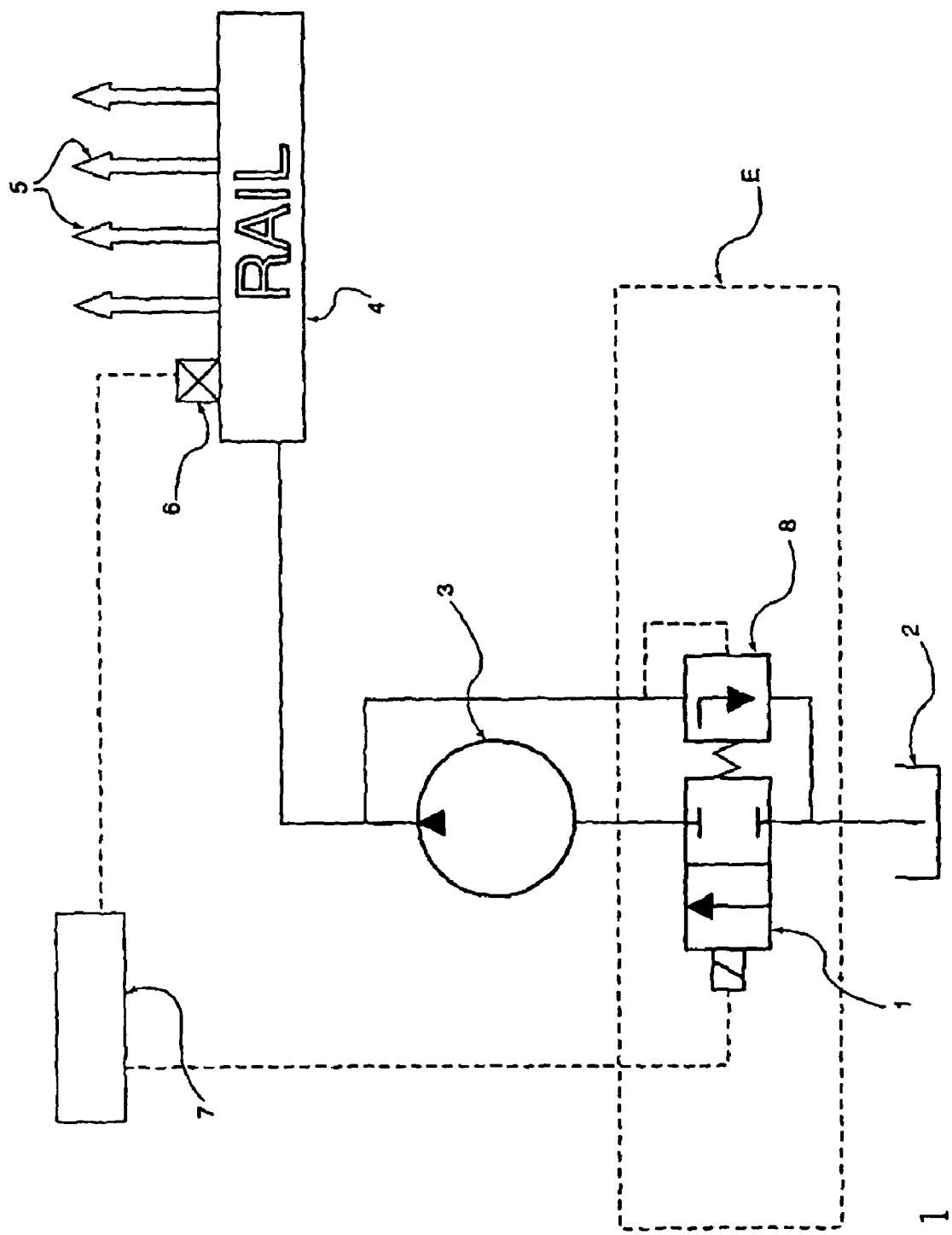
FIG. 1 shows a schematic illustration of the gasoline injection system according to the invention.

With reference to FIG. 1, the solenoid valve (1) of the invention is positioned between the gasoline tank (2) of the vehicle and a high pressure pump (3) for supplying gasoline to the common rail (4). The latter feeds injectors (5) providing gasoline to the cylinders of the motor. The rail (4) is moreover provided with a pressure sensor (6) connected to an electronic central unit (7) which notably provides a set current value to the electromagnet of the solenoid valve (1). Therefore operation is performed in a closed loop. The flap (8) controls a loop connecting the high pressure part of the circuit (downstream from the pump (3)) and the low pressure part of the circuit (upstream from said pump (3)). In fact this loop returns to the inlet of the pump at the inlet of the solenoid valve (1) downstream from the fuel tank (2).

When overpressure is detected in the rail (4) by the pressure sensor (6), the electronic unit (7) sends a zero or low set current value so that the flap (8) may open under the effect of said overpressure. Gasoline is then sent back to the tank (2). The solenoid valve (1) and the flap (8) are in fact joined together in a single entity (E), which forms the discharge rate and pressure control solenoid valve according to the invention.

Figure 2:
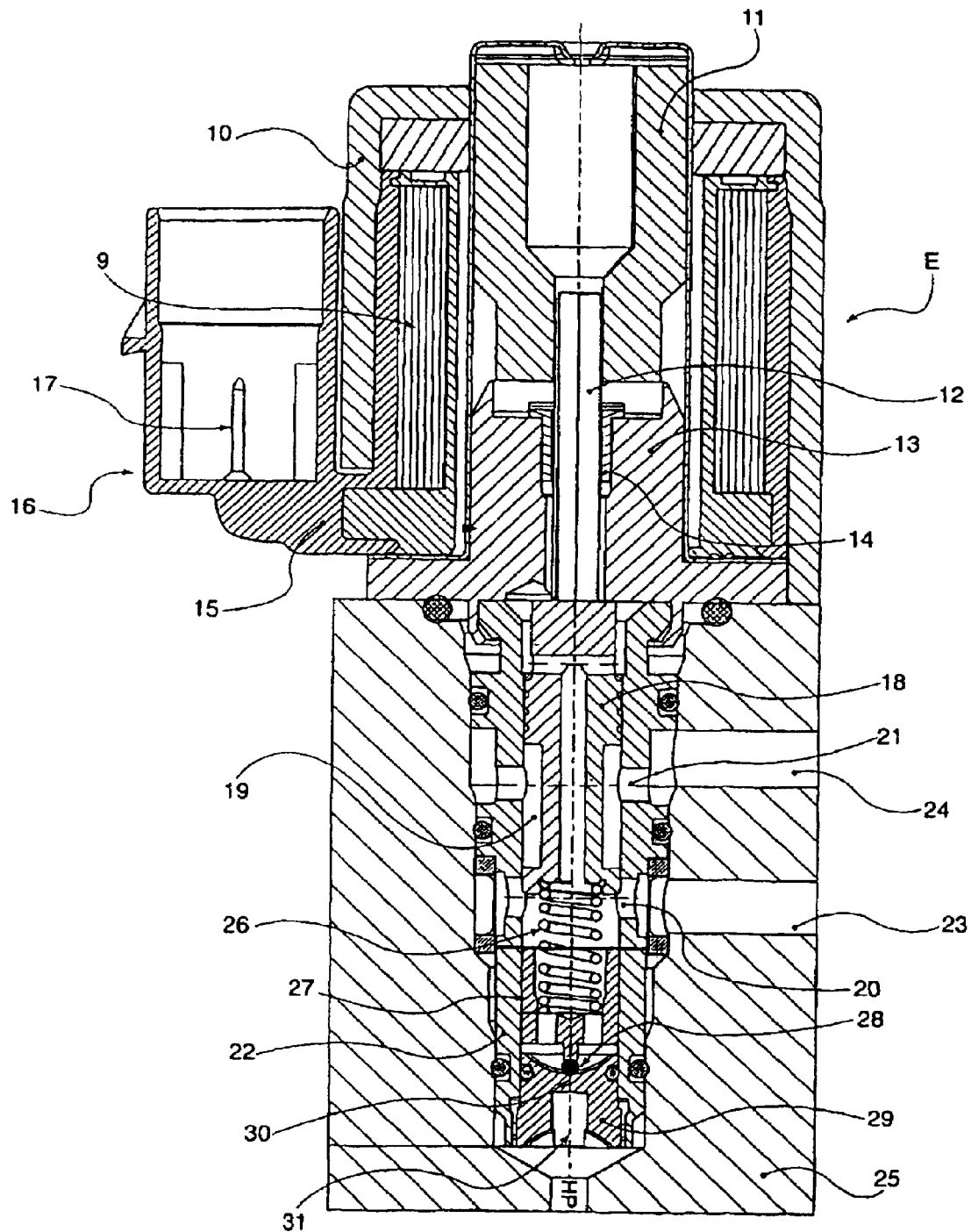
FIG. 2 illustrates, as a sectional view, a solenoid valve with flap and ball according to the invention.

It is illustrated in more detail in FIG. 2, and consists of an electrical sub-assembly which tops a hydraulic sub-assembly. Conventionally, electrical functionalities are provided by an electromagnet which does not in the least need to be described in detail, within the scope of the invention, as it is known per se. It is sufficient to know that it consists of a coil (9) notably integrated into a magnetic armature (10) surrounding a mobile core (11), which drives a pusher (12) notably guided by a low polar part (13) the upper part of which is designed so that by varying the gap which it forms with the mobile core (11), it is possible to generate an electromagnetic force as constant as possible over the stroke of the core (11). A bearing (14) improves the guiding and sliding of the pusher (12). The electromagnet is overmolded in an envelope (15) integrating an external connector (16) containing connection terminals (17), in order to connect it for example to the electronic central unit.

The pusher (12) acts on a slidably mobile spool (18) provided with a peripheral recess (19) provided for connecting a feeding orifice (20) and an exhaust orifice (21) provided in the liner (22) of the hydraulic sub-assembly. These orifices (20) and (21) are connected via conduits (23, 24) of a frame (25) to the low pressure circuit. More specifically, the conduit (23) and the feeding orifice (20) are connected to the fuel tank, whereas the exhaust orifice (21) and conduit (24) are connected to the high pressure pump (3).

A coil spring (26) is positioned in the axis of the spool (18). One of its ends is fixed in an axial housing of said spool (18), whereas its other end actuates a sleeve (27) forming part of the flap device, which also comprises a ball (28). The sleeve (27) slides in the central bore of the liner (22), like the spool (18). The ball (28) rests on a seat (37) made in one piece (29) achieving the link with the high pressure circuit.

Figure 3:
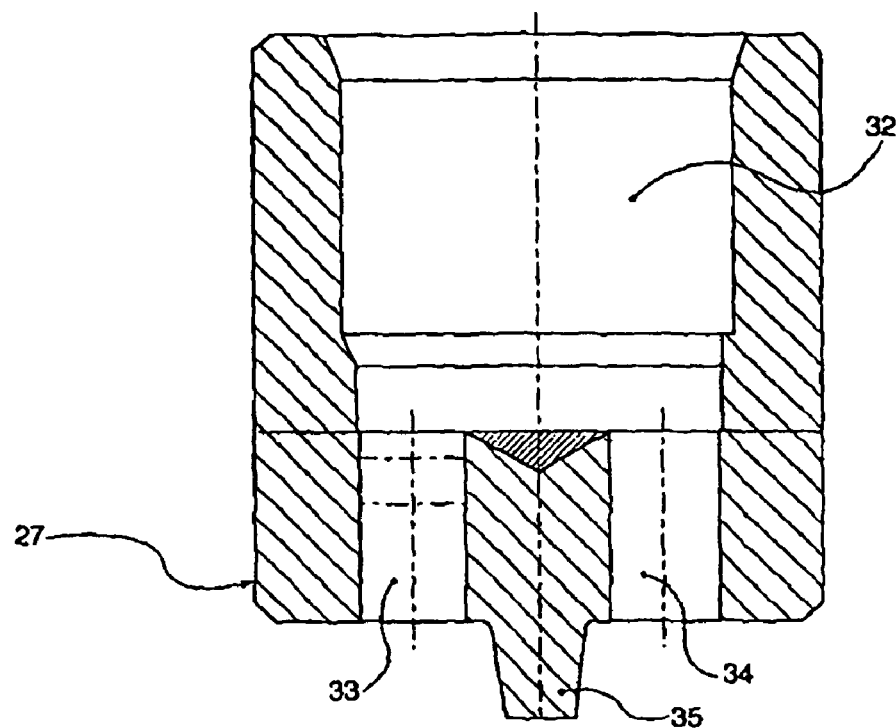
FIG. 3 is a sectional view of a sleeve of the ball flap device.
Figure 4:
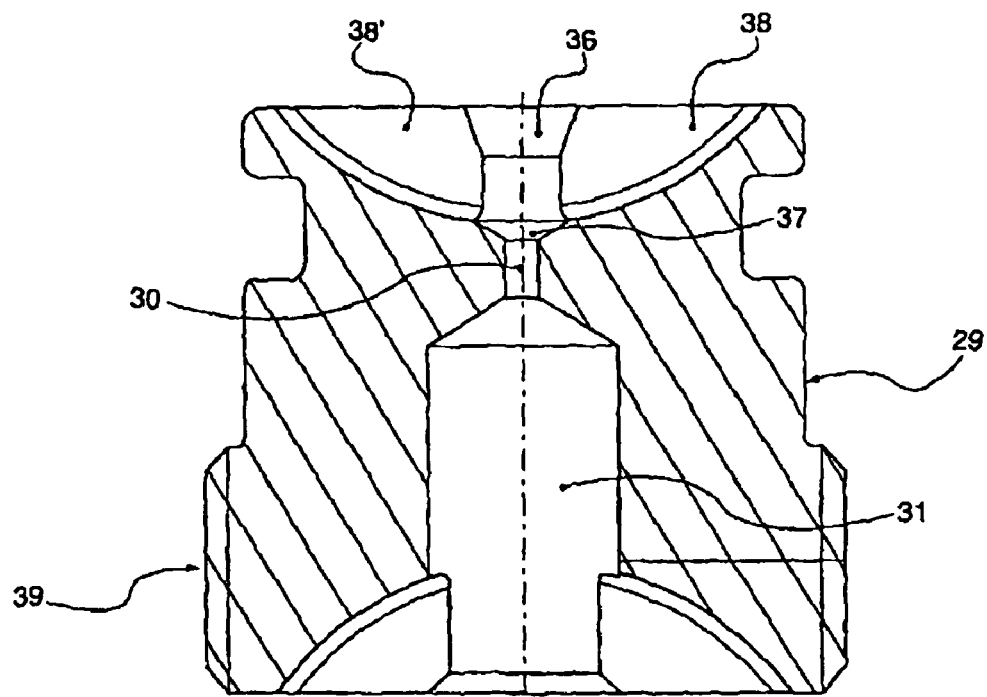
FIG. 4 is still a sectional view of the part including the seat of the ball of the flap device.

Thus, this part (29) includes an inlet orifice (30) immediately located under the seat (37) of the ball (28) and extended by a conduit (31) carrying the high pressure fluid. The sleeve (27) of the flap device as well as the part (29) is shown in more detail in FIGS. 3 and 4, respectively. The sleeve (27) includes, in its face opposite the spool (18), a cylindrical housing (32)

able to receive one of the ends of the spring (26). The diameter of this housing gradually narrows inwards, in order to fix the end of the spring (26). In the extension of the housing (32), channels (34 and 33) allow the fluid to pass through the sleeve (27). These channels, at least two in number, surround a cylindrical protrusion (35), the diameter of which is calculated for insertion into a conduit (36) of the part (29), in order to maintain pressure on the ball when it rests against its seat (37) (cf. FIG. 4). Routes (38 and 38') for discharging the fluid are positioned on either side of the conduit (36) and of the seat (37), made by means of a cylindrical milling cutter with a thickness less than that of the conduit (36). With the threading (39), it is possible to adjust the position of the part (29) to refine the operation of the flap device.

Figure 5:
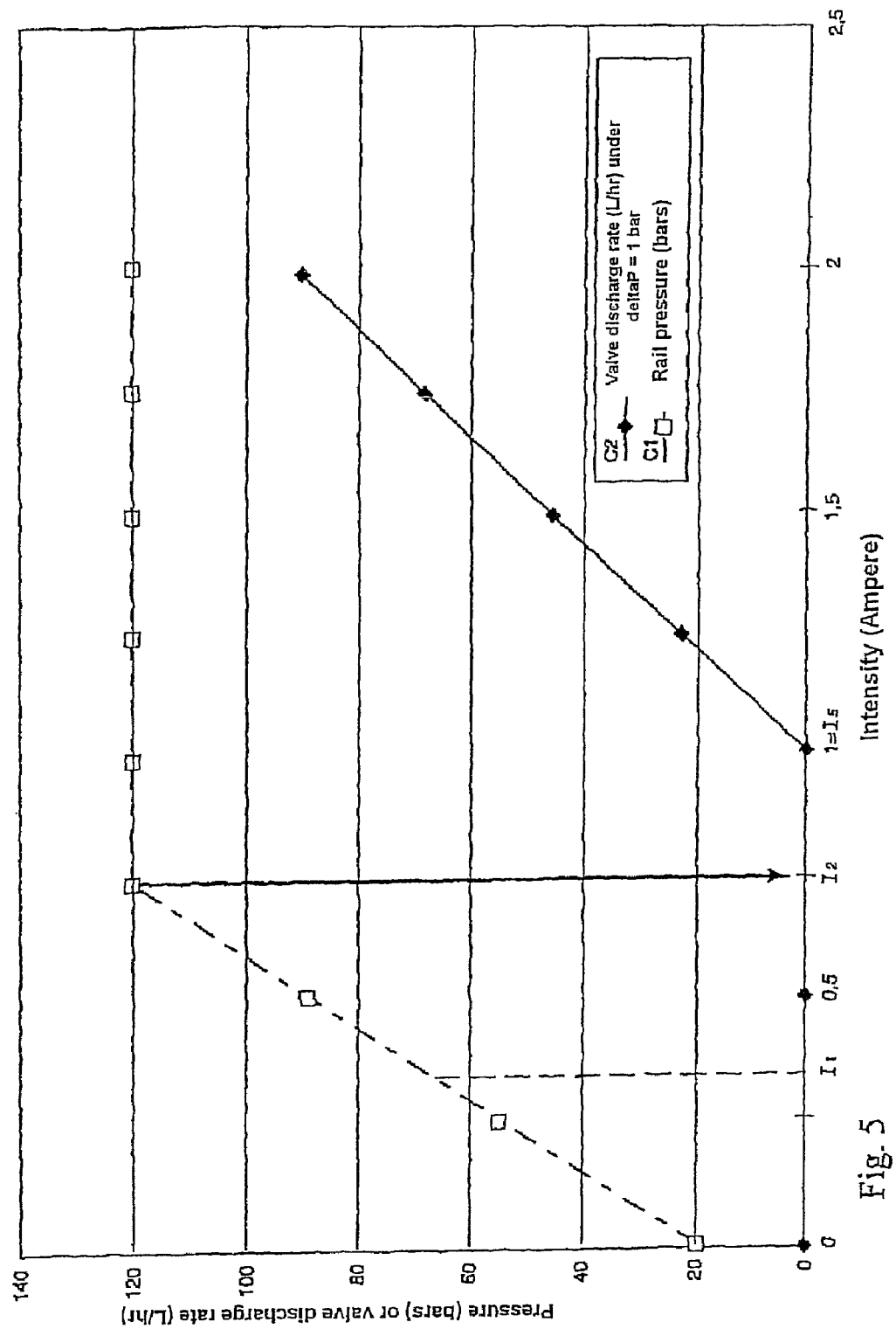
FIG. 5 illustrates ideal pressure and discharge rate characteristics of the solenoid valve of the invention.

The seal of the different components is provided by O-rings distributed all around the liner (22). Operation of the assembly is more easily explained with reference to the diagrams of FIGS. 5 and 6. In particular, its theoretical operation appears in FIG. 5. When the current is equal to zero, the force exerted by the spring (26) on the flap device and notably on the ball (28) allows pressure of the order of 20-30 bars to be contained in the rail (4). For a higher pressure, the flap opens and overpressure is discharged into the liner (22), towards the orifice (20) and the conduit (23). The discharge rate curve ($C_2$) actually shows that for this current value, there is theoretically no discharge rate between the feeding orifice (20) and the exhaust orifice (21). Taking into account the location of the peripheral recess (19), this lack of discharge rate is extended up to a value of about one ampere, following which the discharge rate increases linearly. Now, between zero and one ampere, and as the electromagnet control current intensity increases, the force exerted via the spring (26) on the flap device and consequently on the ball (28) also increases so that it may contain an increasingly large pressure in the high pressure part of the circuit (curve $C_1$). Within the scope of the invention, it is required that the rated operating pressure (120 bars on the figure) be reached for a current value less than the threshold value from which the discharge rate increases linearly (one ampere on curve $C_2$). With this condition, it is possible to control the idle discharge rate very accurately and with constant pressure.

Figure 6:
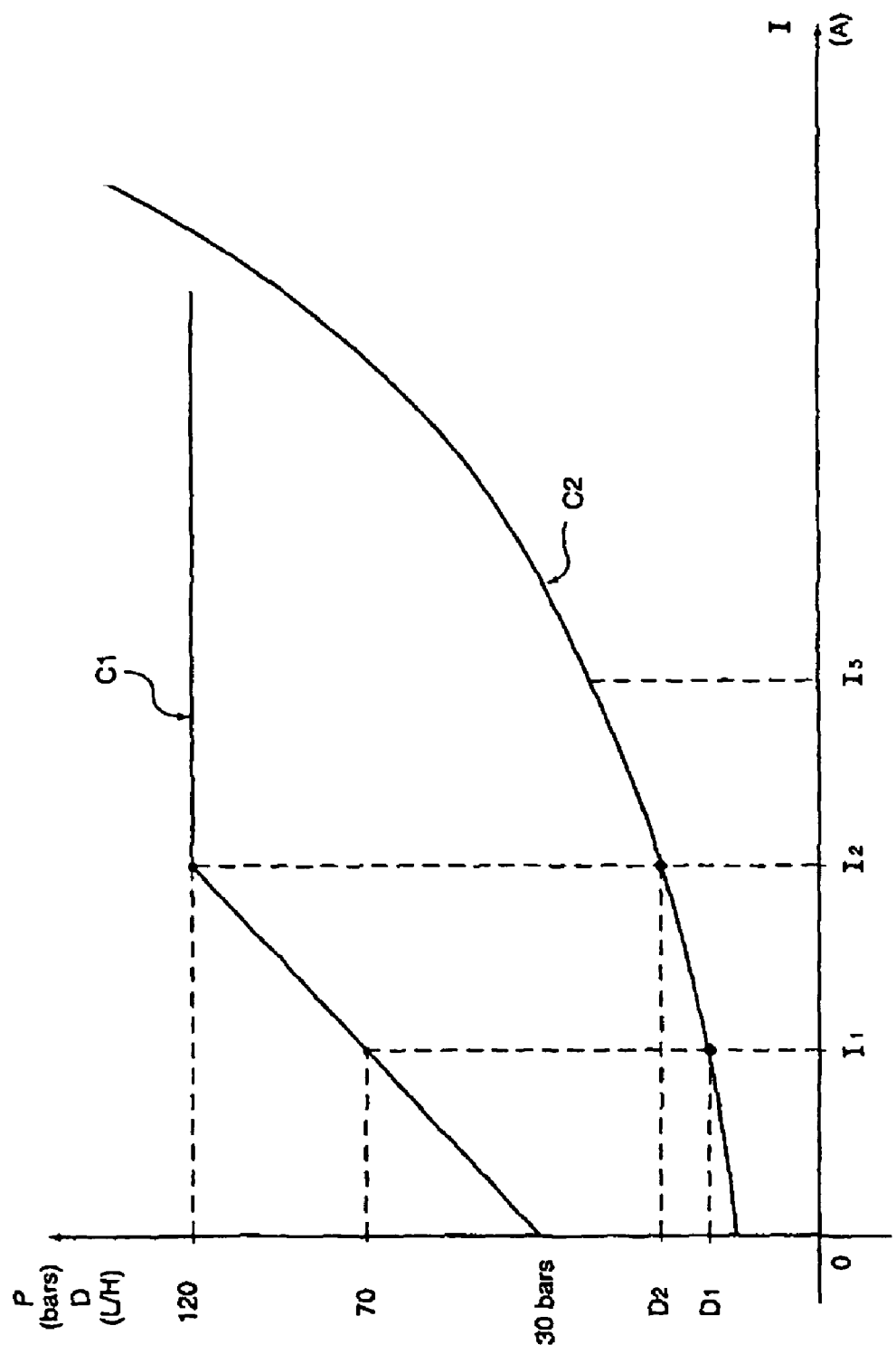
FIG. 6 illustrates these same characteristics in a plot more practically reflecting operation of the solenoid valve of the invention.

In reality, the discharge rate curve ($C_2$) rather has the aspect which appears in FIG. 6. Before obtaining the intensity threshold, there are leaks, directly connecting the inlet orifice (20) and the exhaust orifice (21) via the recess (19). These leaks, provided that they are under control, are not really a major drawback of the invention. However they should be less than the gasoline discharge rate required for having the engine idle. Knowing that the injectors operate from a pressure in the rail equivalent to about 70 bars, it is required that for this value, the leakage rate $D_1$ corresponding to a set current value $I_1$, be less than the gasoline flow rate required for idling.

With the assumption of an engine operating with a rated pressure of 120 bars in the rail, it is then required that this pressure be contained by the flap device for a current value $I_2$, corresponding to a leakage rate $D_2$ at the spool less than the threshold value $I_s$ from which the leak is established between the feeding (20) and exhaust (21) orifices.

In actual operation, the leakage rate is therefore non zero when the current is equal to zero (I=0), and it increases when I increases.

Once again, it is preferable that the value $I_2$ be less than and clearly separated from the $I_s$ value so as not to introduce pressure variations in the rail which may vary the engine speed and therefore generate noise or cause engine running problems.

The requirement of leakage rates less than the gasoline discharge rate required for having the engine idle involves the setting of limiting values for $D_1$ and $D_2$. In reality, the experiments made with solenoid valve prototypes according to the invention show that even when the leakage rate is larger than these limiting values, operation is satisfactory. This is then a so-called mixed mode operation, where both curves are such that $I_s < I_2$, which means that linear operation of discharge rate control occurs before the rated operating pressure value has been reached in the rail (4).

It should be noted that, considering the invention-specific design, such operation may be managed as the leakage rate amount exceeding the threshold values $D_1$ and $D_2$ may be recycled by the flap device, by means of information provided to the electronic central unit by the pressure sensor.

The configuration shown above of course is only a possible example of the invention, which is by no means exhaustive. Any change in the form and configuration which is within the competence of one skilled in the art lies in the scope of the present invention.

The invention claimed is:

1. A flow and pressure control valve comprising:
   a valve body having a bore, and a flow valve inlet and outlet communicable with the bore;
   a flow valve disposed in the bore of the valve body to control communication between the flow valve inlet and the flow valve outlet of the valve body;
   a pressure valve inlet communicable with the flow valve inlet of the valve body;
   a pressure valve axially spaced apart from the flow valve and disposed in the bore to control communication between the pressure valve inlet and the flow valve inlet within the bore of the valve body;
   a biasing member having one end associated with the flow valve and another end associated with the pressure valve to bias the pressure valve in a direction toward a pressure valve closed position and to bias the flow valve in an opposite direction toward a flow valve closed position;
   a pressure valve seat member coupled to the valve body in an axially adjustable manner to adjust a biasing force imposed by the biasing member; and
   a force exerting portion to move the flow valve.

2. A flow and pressure control valve as set forth in claim 1, wherein the pressure valve seat member is threaded to the valve body.

3. A flow and pressure control valve as set forth in claim 1, wherein the force exerting portion is operable to force the flow valve to move and to increase the force applied to the pressure valve by the biasing member, but is not operable to move the flow valve to such an extent that the flow valve inlet is communicated to the flow valve outlet until the force applied to the pressure valve by the biasing member is sufficient to keep the pressure valve closed when pressure at the pressure valve inlet has reached an operating pressure.

4. A flow and pressure control valve comprising:
   a valve body having a bore, and a flow valve inlet and outlet communicable with the bore;
   a flow valve disposed in the bore of the valve body to control communication between the flow valve inlet and the flow valve outlet of the valve body;
   a pressure valve inlet communicable with the flow valve inlet in the bore of the valve body;
   a pressure valve to control communication between the pressure valve inlet and the flow valve inlet of the valve body;

a biasing member between the flow valve and the pressure valve tending to force the pressure valve to close the pressure valve inlet; and a force exerting portion operable to force the flow valve to move and to increase the force applied to the pressure valve by the biasing member, but not operable to move the flow valve to such an extent that the flow valve inlet is communicated to the flow valve outlet until the force applied to the pressure valve by the biasing member is sufficient to keep the pressure valve closed when pressure at the pressure valve inlet has reached an operating pressure.

5. A flow and pressure control valve as set forth in claim 4, wherein the pressure valve is movable against the bias force imposed by the biasing member to open the pressure valve inlet, when pressure at the pressure valve inlet reaches a first pressure and when current applied to the force exerting portion is zero or near zero.

6. A flow and pressure control valve as set forth in claim 5, wherein the flow valve is movable to increase the bias force imposed against the pressure valve to close the pressure valve inlet, when pressure at the pressure valve inlet reaches a second pressure and when current applied to the force exerting portion reaches a first value.

7. A flow and pressure control valve as set forth in claim 6, wherein the flow valve is further movable to further increase the bias force imposed against the pressure valve to close the pressure valve inlet, when pressure at the pressure valve inlet reaches an operating pressure greater than the second pressure and when current applied to the force exerting portion reaches a second value greater than the first value.

8. A flow and pressure control valve as set forth in claim 7, wherein the flow valve is further movable to communicate the flow valve inlet with the flow valve outlet, after pressure at the pressure valve inlet has reached the operating pressure and when current applied to the force exerting portion is greater than the second value.

9. A discharge rate and pressure control valve comprising:
a valve body having an inner bore generally defined by a bore axis, a valve inlet, and a valve outlet;
a spool member at least partially interposed within the inner bore and moveable therein generally along the bore axis;
a biasing member for biasing the spool member within the inner bore;
a force exerting portion for axially moving the spool member within the inner bore; and
a flap device including a flap inlet defined by an inlet flap outer conduit and an inlet flap inner conduit,
wherein the biasing member, in a first valve configuration, permits the flap device to open when pressure within the inlet flap outer conduit reaches a first pressure, and the biasing member, in a second valve configuration, prevents the flap device from opening when pressure within the inlet flap outer conduit reaches a second pressure,
wherein the spool member, in a third valve configuration, directs the flow of a fluid from the valve inlet to the valve outlet when a bias force imposed by the biasing member is sufficient to prevent the flap device from opening after pressure within the inlet flap outer conduit has reached an operating pressure;
wherein the inlet flap inner conduit is in fluid communication with the valve inlet within the inner bore of the valve body.

10. The delivery system of claim 9, wherein the portion of fluid leaking from the valve inlet to the valve outlet is less than the gasoline discharge rate required for having an engine idle.

11. A discharge rate and pressure control valve comprising:
a valve body having an inner bore generally defined by a bore axis, a valve inlet, and a valve outlet;
a spool member at least partially interposed within the inner bore and moveable therein generally along the bore axis;
a biasing member for biasing the spool member within the inner bore;
a force exerting portion for axially moving the spool member within the inner bore; and
a flap device including a flap inlet defined by an inlet flap outer conduit and an inlet flap inner conduit wherein the inlet flap inner conduit is in fluid communication with the valve inlet within the inner bore of the valve body,
wherein the biasing member, in a first valve configuration, permits the flap device to open to communicate the inlet flap outer conduit with the valve inlet when pressure within the inlet flap outer conduit reaches a first pressure, and prevents the flap device from opening until pressure within the inlet flap outer conduit reaches the first pressure, and the biasing member, in a second valve configuration, prevents the flap device from opening when pressure within the inlet flap outer conduit reaches a second pressure,
wherein the spool member, in a third valve configuration, directs the flow of a fluid from the valve inlet to the valve outlet when a bias force imposed by the biasing member is sufficient to prevent the flap device from opening after pressure within the inlet flap outer conduit has reached an operating pressure.

12. The valve of claim 11, wherein the flap inlet is generally defined by a flap axis, and the flap axis is generally co-axial with the bore axis.

13. The valve of claim 11, wherein axial movement of the spool within the inner bore selectively controls the discharge rate of a fluid between the inlet and the outlet.

14. The valve of claim 13, wherein at least a portion of the flap device is in a first position when the valve is in the first valve configuration, the at least a portion of the flap device is in a second position when the valve is in the second valve configuration, and axial movement of the spool within the inner bore to control the discharge rate of a fluid between the inlet and the outlet is only performed when the at least a portion of the flap device is in the second position.

15. A discharge rate and pressure control valve as set forth in claim 11, wherein the first pressure is about 20 to 30 bar, and the force exerting portion is an electromagnet that receives 0 or near 0 amps when the biasing member is in the first valve configuration.

16. A discharge rate and pressure control valve as set forth in claim 11, wherein the second pressure is the operating pressure.

17. The valve of claim 11, wherein the force exerting portion includes an electromagnet.

18. The valve of claim 17, wherein the electromagnet current is 0 or near 0 amps when the valve is in the first valve configuration.

19. The valve of claim 17, wherein the electromagnet current is between 0 amps and a threshold value when the valve is in the second valve configuration.

20. The valve of claim 11, wherein the flap device includes a seat surrounding a flap orifice that defines a boundary between the inlet flap outer conduit and the inlet flap inner conduit, and a ball that selectively contacts the seat to prevent the movement of fluids through the seat.

21. The valve of claim 20, wherein the flap device further includes a sleeve at least partially interposed between the biasing member and the ball, wherein the sleeve includes a ball contacting portion and a cylindrical housing having a diameter that narrows inwards to fix an end of the biasing member to the sleeve.

22. A discharge rate and pressure control valve as set forth in claim 11, wherein the second pressure is an engine idle pressure.

23. A discharge rate and pressure control valve as set forth in claim 22, wherein the engine idle pressure is about 70 bar.

24. The valve of claim 11, wherein the flap device includes a part defining the flap inlet and a sleeve having one side adjacent to the part and another side associated with the biasing member, the part being axially adjustable relative to the inner bore such that a biasing force exerted by the biasing member on the sleeve may be adjusted.

25. The valve of claim 24, wherein axial adjustment of the part of the flap device does not affect the volumetric flow of fluid from the valve inlet to the valve outlet.

26. A delivery system for a fluid which may be used to attain a desired pressure and discharge rate of the fluid, the system comprising:
    a control valve having:
        a valve body having an inner bore generally defined by a bore axis, a valve inlet, and a valve outlet;
        a spool member at least partially interposed within the inner bore and moveable therein generally along the bore axis;
        a biasing member for biasing the spool member within the inner bore;
        a force exerting portion for axially moving the spool member within the inner bore; and
        a flap device including a flap inlet defined by an inlet flap outer conduit and an inlet flap inner conduit wherein the inlet flap inner conduit is in fluid communication with the valve inlet within the inner bore of the valve body,
        wherein the biasing member, in a first valve configuration, permits the flap device to open to communicate the inlet flap outer conduit with the valve inlet when pressure within the inlet flap outer conduit reaches a first pressure, and prevents the flap device from opening until pressure within the inlet flap outer conduit reaches the first pressure, and the biasing member, in a second valve configuration, prevents the flap device from opening when pressure within the inlet flap outer conduit reaches a second pressure,
        wherein the spool member, in a third valve configuration, directs the flow of a fluid from the valve inlet to the valve outlet when a bias force imposed by the biasing member is sufficient to prevent the flap device from opening after pressure within the inlet flap outer conduit has reached an operating pressure; and
    a fluid pump having a pump inlet and a pump outlet, wherein the pump inlet is in fluid communication with the valve outlet.

27. The delivery system of claim 26, wherein the pump outlet is in direct fluid communication with the inlet flap inner conduit such that the flap device may regulate the pressure output of the pump within a portion of the delivery system.

28. The delivery system of claim 26, wherein the flap device selectively permits movement of the fluid within the inner bore.

29. A delivery system as set forth in claim 26, wherein the first pressure is about 20 to 30 bar, and the force exerting portion is an electromagnet that receives 0 or near 0 amps when the biasing member is in the first valve configuration.

30. A delivery system as set forth in claim 26, wherein the second pressure is the operating pressure.

31. The delivery system of claim 26, wherein the spool member has a peripheral recess communicated between the valve inlet and the valve outlet when the spool member is in the third valve configuration, and a portion of fluid leaks from the valve inlet to the valve outlet when the peripheral recess is spaced apart from the valve inlet or the valve outlet.

32. The delivery system of claim 26, further comprising a pressure sensor for detecting the pressure of the fluid within a portion of the delivery system downstream of the pump.

33. The delivery system of claim 32, further comprising a control unit, wherein the control unit supplies power to the force exerting portion in response to a preselected pressure detected by the pressure sensor.

34. The delivery system of claim 26, wherein the force exerting portion includes an electromagnet.

35. The delivery system of claim 34, further comprising a control unit, wherein the control unit supplies current to the electromagnet to reconfigure the valve from the first valve configuration to the second valve configuration.

36. A delivery system as set forth in claim 26, wherein the second pressure is an engine idle pressure.

37. A delivery system as set forth in claim 36, wherein the engine idle pressure is about 70 bar.

38. A discharge rate and pressure control valve comprising:
    a valve body having an inner bore generally defined by a bore axis, a valve inlet, and a valve outlet;
    a spool member at least partially interposed within the inner bore and moveable therein generally along the bore axis;
    a biasing member for biasing the spool member within the inner bore;
    a force exerting portion for axially moving the spool member within the inner bore; and
    a flap device including a flap inlet defined by an inlet flap outer conduit and an inlet flap inner conduit,
    wherein the biasing member, in a first valve configuration, permits the flap device to open when pressure within the inlet flap outer conduit reaches a first pressure, and the biasing member, in a second valve configuration, prevents the flap device from opening when pressure within the inlet flap outer conduit reaches a second pressure,
    wherein the spool member, in a third valve configuration, directs the flow of a fluid from the valve inlet to the valve outlet when a bias force imposed by the biasing member is sufficient to prevent the flap device from opening after pressure within the inlet flap outer conduit has reached an operating pressure;
    wherein the inlet flap inner conduit is in fluid communication with the valve inlet within the inner bore of the valve body;
    wherein the flap device includes a seat surrounding a flap orifice that defines a boundary between the inlet flap outer conduit and the inlet flap inner conduit, and a ball that selectively contacts the seat to prevent the movement of fluids through the seat;
    wherein the flap device further includes a sleeve at least partially interposed between the biasing member and the ball, wherein the sleeve includes a ball contacting portion and a cylindrical housing having a diameter that narrows inwards to fix an end of the biasing member to the sleeve.

* * * * *